May 17, 1938.  L. NIEMCHEK  2,117,445

FINNED STRUCTURE AND METHOD OF MAKING SAME

Filed April 3, 1936

INVENTOR.

Louis Niemchek

BY Morsell, Lieber & Morsell
ATTORNEYS.

Patented May 17, 1938

2,117,445

UNITED STATES PATENT OFFICE 2,117,445

FINNED STRUCTURE AND METHOD OF MAKING SAME

Louis Niemchek, Milwaukee, Wis., assignor, by mesne assignments, to Reconstruction Finance Corporation, Chicago, Ill., a corporation Application April 3, 1936, Serial No. 72,549

10 Claims. (Cl. 113—118)

The present invention relates in general to improvements in the art of manufacturing finned structures for transferring heat, and relates more specifically to improvements in the mode of applying and of attaching helical fins to conduits such as air conditioner and condenser coils.

Generally defined, an object of the present invention is to provide an improved finned heat transfer structure which is simple and durable in construction, and which is moreover highly effective in actual use.

In the art of refrigeration and air conditioning, it is common practice to utilize heat transfer coils having external fins disposed along and extending away from the exterior surfaces of the coils or pipes. In one form of prior finned structure of this general type, the individual coil sections or pipes were each provided with a relatively deep helical groove, and a flat helical strip was wound edgewise around the pipe with one edge embedded in the groove, the pipe subsequently being peened along the adjacent outer edges of the groove to lock the continuous helical fin in place. This method of attaching the fins, while effectively holding them in place, was objectionable because it undesirably weakened the pipe at the fin receiving groove, and it did not provide sufficient heat transferring contact surface between the fin and the coil. It has also been proposed to increase the heat transferring contact surface, by pleating or corrugating the pipe engaging edge of the helical fin, but such a fin could not be fitted into a deep preformed groove and it was therefore the custom to merely force the corrugated edges of these fins into intimate contact with the pipes and to subsequently secure a permanent fastening by galvanizing or otherwise coating the joints. This method of construction produced relatively irregular finned assemblages, because it was impossible to prevent shifting or displacement of the fins along the pipes during the application of the coatings.

The present invention therefore contemplates the provision of an improved method of producing helical fins and of applying the same to conduits such as pipes, in a most effective manner so as to produce a final assemblage having a regular corrugated final helical fin permanently attached to the coil without weakening the same.

Another specific object of the invention is to provide an improved finned coil wherein a continuous corrugated helical fin is positively spaced along the coil section to provide a helix of uniform pitch, without necessitating the provision of an undesirable deep helical recess prior to application of the fin.

A further specific object of the invention is the provision of a finned pipe assemblage wherein maximum surface contact between the fin and pipe is made available, and in which a most effective final attachment may be obtained by galvanizing or the like.

Still another specific object of the invention is to provide an improved fin assemblage which can be rapidly manufactured to provide a durable and efficient final coil structure.

These and other objects and advantages of the present invention will be apparent from the following detailed description.

A clear conception of the features constituting the present improvement, and of the mode of producing finned structures in accordance with the invention, may be had by referring to the drawing accompanying and forming a part of this specification wherein like reference characters designate the same or similar parts in the several views.

While the improvement has been shown and described herein as being specifically embodied in a coil section especially adapted for air conditioning service, it is not the intent to thereby unnecessarily restrict the scope.

Figure 1:
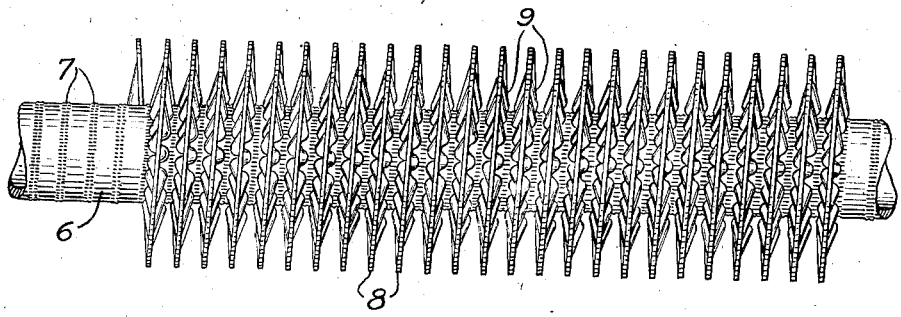
Fig. 1 is a side elevation of a fragment of a heat transfer coil having a helical fin applied thereto in accordance with the invention.
Figure 2:
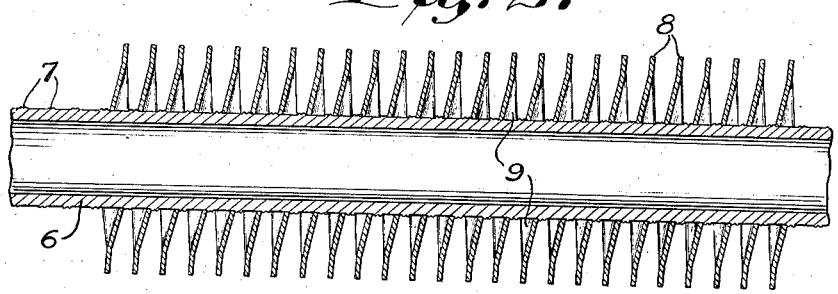
Fig. 2 is a central longitudinal section through the assemblage of Fig. 1.
Figure 4:
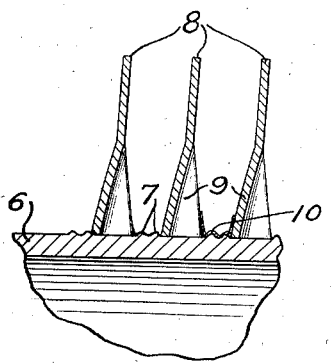
Fig. 4 is an enlarged fragmentary central longitudinal section through the coil and fin.
Figure 3:
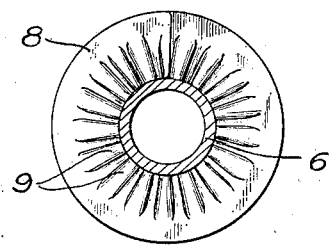
Fig. 3 is an end view of the finned assemblage.

Referring to the drawing, the improved finned assemblage shown therein, comprises in general a conduit section or pipe 6 formed of any suitable metal and having a continuous helix of knurling 7 applied to and extending along the outer surface thereof; and a continuous metallic helical fin 8 having its inner edge provided with regular pleats or corrugations 9 which coact with the external surface of the pipe 6 between the knurling 7 as clearly illustrated in Fig. 4.

The fin 8 is formed of a flat band or ribbon of metal, and is corrugated and wound around and helically along the pipe, by means of a machine of rather well known construction having rollers which are adapted to simultaneously initially crimp or slightly corrugate the inner edge of the ribbon while it is being edge-wound upon the pipe 6. The knurling 7 may be applied to the pipe 6 by means of knurling rollers of usual construction, before the fin 8 is wound in place, and the width of the fin across the corrugations 9 should be approximately equal to the distance between the successive sections of the helix formed by the knurling 7. When the corrugated inner edge of the fin 8 is forced into intimate contact with the pipe 6 between the knurling 7, the crests of the corrugations 9 will abut against the projections of the knurling 7 which will thus retain the fin in truly helical shape and will prevent shifting thereof along the pipe 6. The entire assemblage may thereafter be galvanized or otherwise coated, and the coating will adhere to the knurling 7 and to the adjacent corrugations 9 and will thus produce an intimate and durable union between the pipe 6 and fin 8.

From the foregoing description it will be apparent that the present invention provides a simple method of applying helical fins 8 to conduits or pipes 6 so as to produce a durable and effective final assemblage. The knurling 7 provides simple and readily applicable means for positively locating the helical fins 8 upon the coils, without necessity of weakening the pipes 6 and introducing danger of leakage. The knurling 7 moreover provides protuberances or irregularities which tend to more effectively retain the galvanizing, and the corrugations 9 provide maximum heat transfer surface besides materially strengthening and stiffening the helical fins 8. The improved assemblages can be rapidly and conveniently manufactured in any desired lengths, and the pitch of the helices may be varied as desired.

It should be understood that it is not desired to limit this invention to the exact steps of the mode of production, or to the precise details of construction, herein shown and described, for various modifications within the scope of the claims may occur to persons skilled in the art.

I claim:

1. The method of producing a finned structure, which comprises, providing a helix of protuberances upon the exterior of a pipe, and forcing the corrugated edge of a helical fin into intimate contact with the exterior of the pipe between the successive sections of the helix of protuberances.

2. The method of producing a finned structure, which comprises, knurling a continuous helix upon and along the exterior of a pipe, forcing the inner corrugated edge of a helical fin into intimate contact with the pipe exterior between the successive sections of the knurled helix, and applying a coating to the assemblage.

3. The method of producing a finned structure, which comprises, knurling a continuous helix upon and along the exterior of a pipe, forcing the inner corrugated edge of a helical fin into intimate contact with the pipe exterior between the successive sections of the knurled helix, and galvanizing the knurling and the joint between the fin corrugations and the pipe.

4. A finned structure comprising, a pipe having a continuous cylindrical external surface and a helix of knurling extending outwardly beyond said surface, and a helical fin having a corrugated inner edge intimately engaging said pipe surface between the successive sections of the knurled helix.

5. A finned structure comprising, a pipe having a continuous cylindrical external surface and a knurled helix extending outwardly beyond said surface, a helical fin having a corrugated inner edge intimately engaging said pipe surface adjacent said knurled helix, and a coating applied to said pipe and fin over said knurled helix and said corrugated inner edge.

6. A finned structure comprising, a pipe having a continuous cylindrical external surface and a helix of protuberances extending outwardly beyond said surface, and a helical fin having a corrugated inner edge engaging said pipe surface between successive sections of said helix.

7. A finned structure comprising, a pipe having a continuous cylindrical external surface and a helix of protuberances extending outwardly beyond said surface, a helical fin having a corrugated inner edge engaging said pipe surface between successive sections of said helix, and a metallic coating applied to said pipe and fin at the zone of engagement thereof.

8. A finned structure comprising, a pipe having a continuous cylindrical external surface and a helix of integral protuberances extending outwardly beyond said surface, and a helical fin having a laterally corrugated inner edge intimately engaging said pipe surface between successive sections of the helix and also engaging the adjacent protuberances.

9. A finned structure comprising, a pipe having a continuous cylindrical external surface and a helix of integral protuberances extending outwardly beyond said surface, a helical fin having a laterally corrugated inner edge intimately engaging said pipe surface between successive sections of the helix and also engaging the adjacent protuberances, and a metallic coating applied to said pipe and fin over said protuberances and said corrugated inner edge.

10. The method of producing a finned structure, which comprises, knurling a helix upon and along the exterior of a pipe, and forcing the inner corrugated edge of a helical fin into intimate contact with the pipe exterior between the successive sections of the knurled helix.

LOUIS NIEMCHEK.